United States Patent [19]
Lendi et al.

[11] 4,172,325
[45] Oct. 30, 1979

[54] INTERIOR GAUGE

[75] Inventors: Georges Lendi, Crissier; Nicolae Voinescu, Lausanne, both of Switzerland

[73] Assignee: Tesa S.A., Vaud, Switzerland

[21] Appl. No.: 893,022

[22] Filed: Apr. 3, 1978

[30] Foreign Application Priority Data

Apr. 7, 1977 [CH] Switzerland .................. 4424/77

[51] Int. Cl.$^2$ .......................... G01B 7/28; G01B 7/12
[52] U.S. Cl. ................................ 33/178 E; 33/143 L
[58] Field of Search ............ 33/143 L, 143 R, 147 N, 33/172 E, 174 L, 174 P, 174 Q, 178 E, 178 R, 147 F

[56] References Cited

U.S. PATENT DOCUMENTS

| | | | |
|---|---|---|---|
| 1,819,144 | 8/1931 | Aulenback | 33/178 R |
| 2,661,540 | 12/1953 | Dulligan | 33/178 R |
| 2,766,532 | 10/1956 | Eisele | 33/178 R |
| 3,030,709 | 4/1962 | Eisele | 33/174 Q |

*Primary Examiner*—Willis Little
*Attorney, Agent, or Firm*—Anthony J. Casella

[57] ABSTRACT

A hand-held interior gauge for measuring a bore includes a body provided with a measuring head capable of being introduced into the bore, and a measuring transducer connected to a movable feeler and adapted to produce output signals representative of the displacement of the movable feeler. The gauge also includes a mechanism for immobilizing the measuring head while in the bore, such that the feeler is movable angularly and radially in a surface limited by a circumference contained in a plane perpendicular to the axis of revolution of the bore, once the measuring head is immobilized. A driving mechanism forming a portion of the interior gauge coordinates the angular and radial movement of the movable feeler, and the output signals from the feeler are provided to a calculator which, in turn, provides intelligence information to an automatic display device for displaying the diameter of the bore.

12 Claims, 7 Drawing Figures

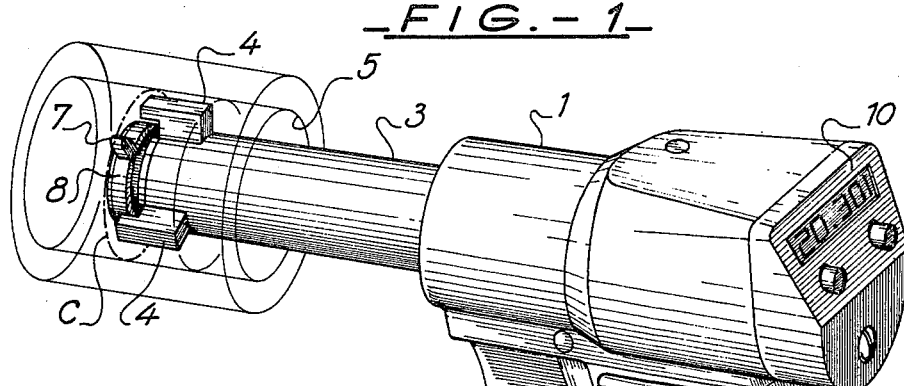
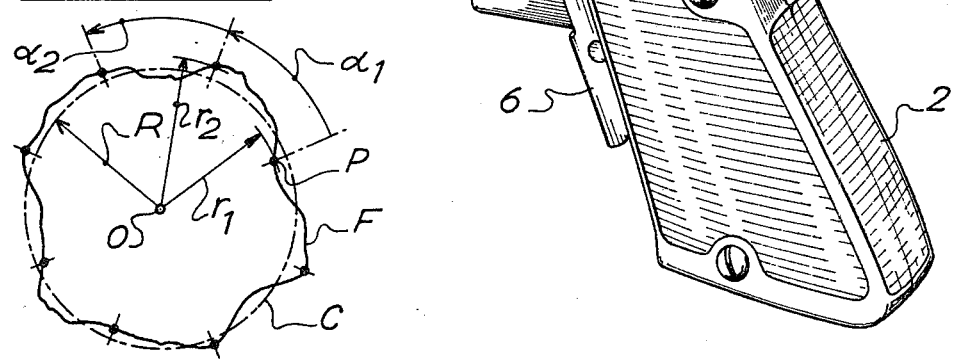
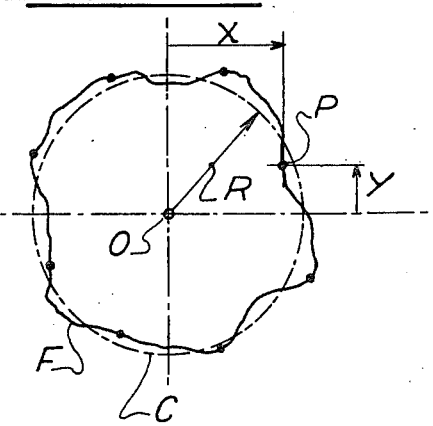
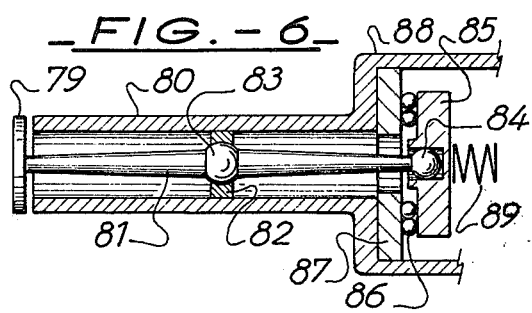
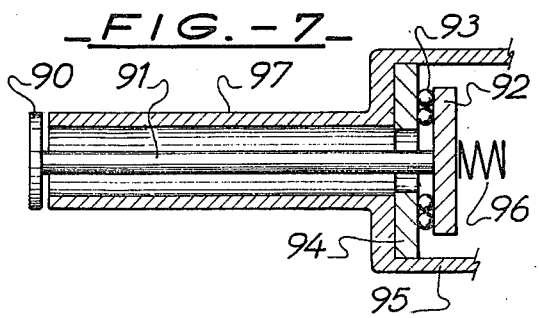

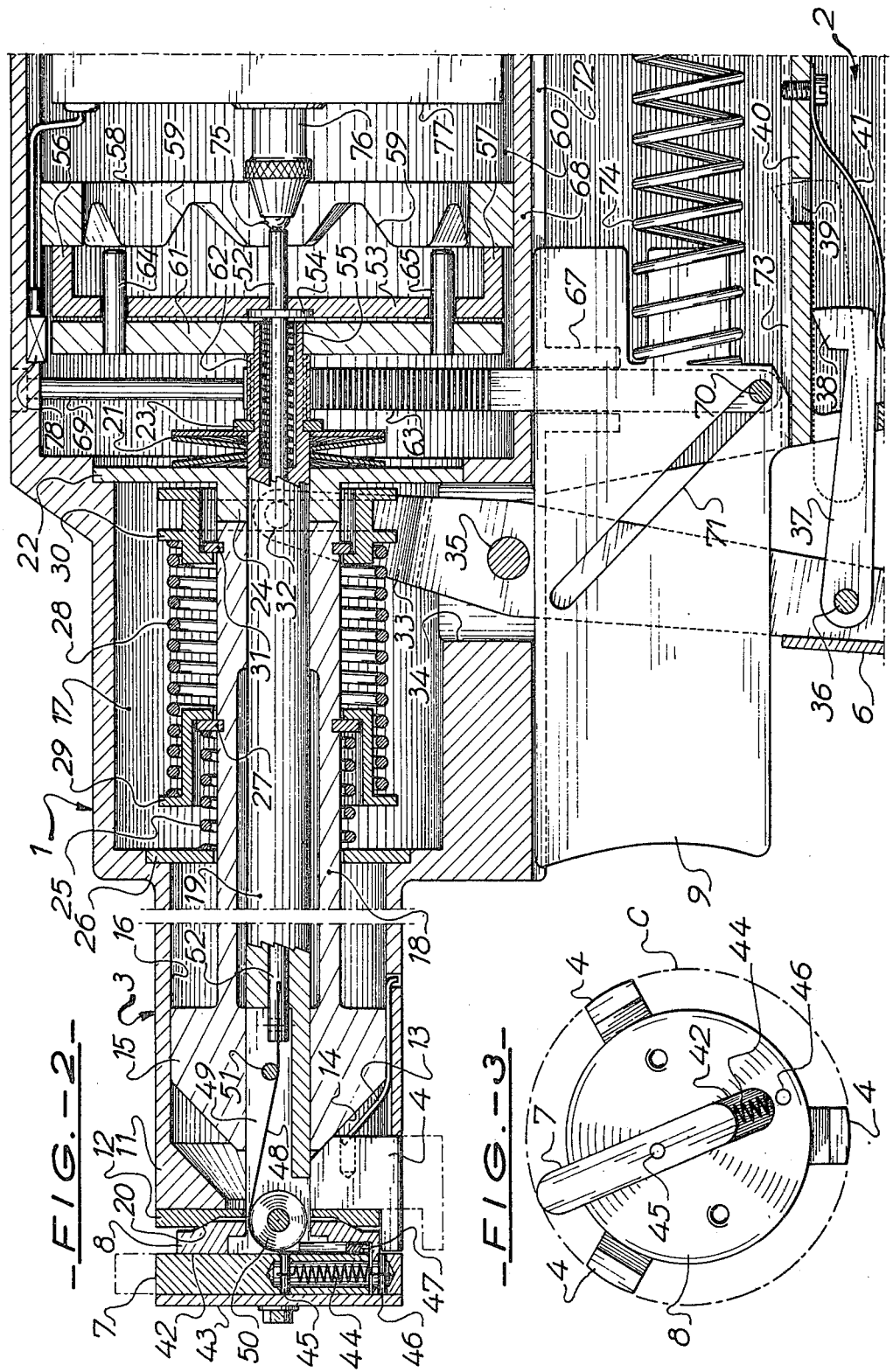

INTERIOR GAUGE

The present invention relates to an interior gauge adapted for measuring the diameter of bores of machined workpieces and which comprises a body provided with a measuring head adapted to be introduced into the bore to be measured, a measuring feeler movable with respect to the said head and adapted to put in contact with the wall of the bore and a measurement transducer, a movable component of which is connected to the movable feeler, adapted to produce signals representative of the displacement of the said movable feeler.

Measuring instruments of this type are known which give satisfaction and the small size presents the advantage of permitting the measurement of bores in-situ, that is to say either in the course of machining or in place in a mechanical assembly where access is dificult.

Likewise interior gauges are known in which the movable feeler, disposed in a position diametrically opposed to a fixed feeler secured to the measuring head, is displaced radially in a slide and pressed against the wall of the bore, and in which the said movable feeler entrains graduated scale which is displaced in front of a vernier secured to the measuring head, and the reading of the graduations is facilitated by an optical enlarger.

For the measurement of a bore this interior gauge necessitates a series of manipulations which render the operation relatively long. The movable feeler must first of all be drawn into the measuring head, then this measuring head must be introduced obliquely into the bore, subsequently the movable feeler has to be released so that it can bear by a spring on the wall of the bore then locked with a slight friction as soon as this contact is obtained. The instrument then has to be rocked in the direction opposite to the one of its obliqueness and finally the apparatus has to be withdrawn from the bore so as to be able to read the scale. Moreover, the taking of measurement by rocking of the instrument is delicate and necessitates a certain judgement so as to ensure the passage of the axis of the two feelers through the diameter of the bore during this rocking.

Likewise there are already known bore verification apparatus in which the measuring head is provided with three radial measuring feelers regularly spaced on its periphery and which are resiliently applied by their oblique bases on the controlled axially displaceable measuring cone disposed inside the measuring head. In these apparatus, the axial displacement of a measuring cone, proportional to the radial displacement of the three measuring feelers, is used for producing quantified information relative to the diameter of the bore felt by three feelers. In these apparatus the use of three measuring feelers permits automatic centering of the measuring head in the bore to be measured and the measurement operation is simplified with respect to that of the gauge precedingly described as it suffices to introduce the measuring head in the bore, to maintain it with one hand whilst the other hand operates on the mechanism for controlling extension of the three radial measuring feelers up to the point where these come into contact with the wall of the said bore.

The reading is effected then generally on these apparatus on a vernier in front of which is rotatably displaced a graduated drum secured with a micrometer measuring screw the rotation of which effects the translation of the measuring cone. However, with this apparatus the measuring operation is still relatively delicate because the stron demultiplication resulting from the transmission micrometer screwcone-feeler produces pressure forces of the feelers against the wall of the bore to be measured which can be large because they are difficult to control by the operator and these forces effect considerably frictions on the surfaces of contact of these movable components, in particular between the cone and the feelers, which have the effect of provoking rapid wear.

According to the present invention there is provided an interior gauge comprising a body provided with a measuring head capable of being introduced into a bore to be measured, a measuring feeler movable with respect to the said head and adapted to be put into contact with the wall of the bore, and a measurement transducer, the movable components of which are connected to the movable feeler, adapted to produce output signals representative of the displacement of the said movable feeler, a mechanism for immobilising the measuring head in the bore to be measured including members for bearing on the wall of the said bore and a manual control for the said mechanism, a feeler movable angularly and radially in a surface limited by a circumference contained in a plane perpendicular to the axis of revolution of the bore to be measured once the measuring head is immobilised, a shaft carrying the said movable feeler, a driving mechanism for the said shaft and for the said movable feeler including members adapted to effect and co-ordinate the angular and radial movement of the movable feeler and to put this into successive contacts with the wall of the bore at a chosen number of points spaced over the said circumference of the said bore, a calculator for the treatment of the said signals connected to the measuring collector via a connecting circuit, a position detector for the movable feeler inserted in the said circuit comprising a component sensitive to the said position and adapted to close the said circuit at each chosen contact of the movable feeler with the wall of the bore to be measured, and a display device for displaying the value represented by the output signal of the calculator adapted to be connected to the output of the said calculator.

The present invention will be described further, by way of example with reference to the accompanying drawings, in which:

FIG. 1 is a perspective view of an interior gauge;

FIG. 2 is an axial section of the gauge of FIG. 1, on an enlarged scale;

FIG. 3 is an end view of part of the gauge shown in FIG. 2;

FIGS. 4 and 5 are diagrams illustrating the principals of the methods of measurement; and FIGS. 6 and 7 are schematic representations of two alternative arrangements.

The interior gauge represented in FIG. 1 comprises a body 1 having a handle 2 provided with a cylindrical measuring head 3.

The measuring head 3 has three extendable jaws 4 near its end, two of which are visible on this view, in their outer position. These jaws 4 are adapted to immobilise the measuring head 3 of the gauge in a bore 5 to be measured of a machined workpiece, shown here in fine lines, by pressure against its inner cylindrical wall. The extension movement of these jaws 4 is controlled by a retaining lever 6 pivoted in the body 1.

The end of the measuring head 3 includes a measuring feeler 7 radially movably mounted in a radial slide of a rotatable disc 8 the axis of rotation of which is parallel to the generatrix of contact of the extendable jaws 4. This measuring feeler 7 explores the bore by a sweeping circular movement around the inner circumference C of the bore 5. This circular sweeping movement of the measuring feeler 7 is controlled by a sliding trigger 9 which when a full revolution has been performed, releases the latch of the lever 6.

On the end opposite to the measuring head 3, the body 1 of the gauge includes an automatic display device 10 for the displaying diameter of the bore 5 explored by the measuring feeler 7.

FIGS. 2 and 3 show in detail the mechanism permitting these diverse effects.

The three extendible jaws 4 are mounted in three radial grooves cut in the end 11 of the measuring head 3 and are distributed at an angle of 120° from one another. These jaws 4 are enclosed in their grooves by a cover 12 secured by screws, not shown, against the end 11 of the measuring head 3.

These jaws 4 are automatically returned into their retracted position by leaf springs 13 which also have the function of maintaining them pressed against the frustoconical end 14 of a first cylindrical control shaft 15 for causing their extension. This shaft 15 is coaxial with the cylindrical measuring head 3, slides axially in a bore 16 thereof and extends into a first compartment 17 of the body 1 by a reduced diameter extension 18. Inside this shaft 15 a second cylindrical shaft 19 is coaxially mounted which is rigidly connected to the rotatable disc 8 carrying the measuring feeler 7. This shaft 19 is freely rotatably mounted in the first shaft 15, and the rotatable disc 8 is centered in the cover 12 of the measuring head 3 by pressure of a conical surface 20 of this disc 8 in a corresponding conical recess in cover 12. This pressure is resiliently ensured by a set of resilient washers 21 interposed between a fixed disc 22 covering the compartment 17 and a securing washer 23 inserted in a groove of the shaft 19, the central part of the fixed disc 22 being formed into a guiding bearing 24 for the said shaft 19.

In the compartment 17 of the body 1 a first spiral spring 25 is mounted on the extension 18 of the shaft 15 and compressed between a washer 26 bearing in a circular groove of the body 1 and a securing washer 27 inserted in a groove formed in the extension 18. Concentrically with this first spring 25 there is mounted a second spiral spring 28 compressed between a flange 29 bearing on the securing washer 27 and a second flange 30 bearing on a second securing washer 31 inserted in a second groove formed in the extension 18.

The flange 30 has a circular thread into which are inserted the two trunnions 32, represented in broken lines, of a fork 33 secured to the control lever 6. The two branches of this fork 33 come together at the level of a port 34 of the body 1 in which they are pivoted on an axle 35 and then extend downwardly on both sides of the trigger 9 then rejoin finally to form the lower end of the lever 6. Pivoted on an axle 36 of this lever 6 is mounted a pawl 37, the lug 38 of which is made so as to click into place in a housing 39 made in a partition 40 of the handle 2 under the effect of a leaf spring 41, in the position shown in fine dotted lines when the lever 6 is pressed.

In the position shown in FIG. 2, the combined action of the return springs 13 of the jaws 4 and of the first spiral spring 25 has the effect of maintaining the shaft 15 and its extension 18 retracted towards the right hand side of the drawing and in abutment against the bearing 24 of the fixed disc 23 with jaws 4 retracted in their grooves. Also, the second spiral spring 28, the pressure of which is greater than the combined pressures of the springs 13 and 25, has no effect on the shaft 15 because its two flanges 28 and 30 are immobilised and retained by the securing washers 27 and 31 secured to the extension 18 of the shaft 15. However, as soon as an operator actuates the lever 6, the flange 30 is pushed towards the left by the fork 33 and thus frees the shaft 15 from the action of spring 25, and the shaft 15 then receives all the force of the spiral spring 28 via the flange 29 bearing on the securing washer 27. This force is transmitted, via the cone 14 of the shaft 15, to the jaws 4, which then come to bear against the wall of the bore to be measured and are immobilised thereagainst, as represented in FIG. 1, whilst the operator draws the lever 6 to the end of the course so as to latch its retaining pawl 37.

The measuring head 3 is now immobilised in the bore to be measured and the exploration thereof by the movable feeler 7 can be effected.

This measuring feeler 7, of substantially square section having rounded ends, is housed in a radial groove 42 of the rotatable disc 8 enclosed in this groove by a cover 43 fixed to the rotatable disc 8 by two screws. This arrangement is quite visible in FIG. 3 where the cover 43 has been removed and the feeler 7 and the jaws 4 are shown in the extended position.

It is to be noted here that the relative angular position of the jaws, the movable feeler and the body of the gauge are shown intentionally different in FIGS. 1, 2 and 3 so as to facilitate understanding thereof.

The movable feeler 7 is brought back to the retracted position by the effect of a tension spiral spring 40 connected at one end to a small axle 45 provided near the bottom of a cylindrical hole of the feeler 7 and at its other end to a second small axle 46 provided in a corresponding hole in the rotatable disc 8. The movable feeler 7 is connected at its inner end 47 to a non-extensible flexible metallic blade 48 which is engaged in an axial groove 49 at the end of the shaft 19. The blade 48 passes around a pulley 50, then against a trunnion 51, then finally is securely fixed in a slot in the end of a cylindrical rod 52 coaxial with and slidably mounted in an axial hole of the shaft 19.

This cylindrical rod 52 emerges from the other end of the shaft 19 where it bears on a disc 53 via a collar 54 under the effect of a spiral spring 55 housed in an end chamber of the shaft 19. The disc 53 has two diametrically opposed fingers 56 and 57, which by the effect of the spring 55, bear on a fixed circular cam 58 having teeth 59, fixed in a second compartment 60 of the body 1.

Between the securing washer 23 and an end flywheel 61 which is securely fixed thereto, the shaft 19 has a part 62 toothed over the whole of its periphery in a manner to constitute a pinion engaging a rack 63.

The disc 53 is angularly connected to the flywheel 61 by two driving fingers 64 and 65 secured to the flywheel 61 and engaged in two corresponding holes of the disc 53, this mounting permitting the rod 52 to be displaced axially without turning the shaft 19 carrying the movable feeler 7.

The rack 63 is guided, on the one hand, from below by a slide 67 fixed to the lower wall 68 of the body 1 and, on the other hand, from above by a rod 69 likewise fixed to the body 1 and sliding in an axial hole of the said rack 63. This rack 63 terminates at its lower end with a driving trunnion 70 which engages in a slide 71 in the form of a port in the trigger 9 and inclined substantially at 45°.

The trigger 9 slides in two parallel grooves 72 and 73 respectively formed in the lower wall 58 of the body 1 in the partition 40 of the handle 2 and is maintained in the outer position by a spring 74 mounted in the handle 2.

The teeth 59 of the fixed circular cam 58, here eight in number, are regularly arranged on the periphery of the cam 58, and these teeth 59 have a depth slightly greater than the axial course of the rod 52 corresponding to the maximum radial course of the movable feeler 7 in rotatable disc 8. The translatory movement of these two components, rod 52 and movable feeler 7 is provided by the metallic blade 48.

On the end of the rod 52 beyond the bearing collar 54, the feeler 75 of an electronic measuring collector 76 is applied, for example of known induction type providing an output electric signal representative of the displacement of the said feeler 7. This electric signal is introduced in to a calculator 77, upon release of the fingers 56 and 57 of the disc 53 in the teeth 59 of the fixed cam 58, by means of a contactor 78 interposed in the circuit connecting the collector 76 to the calculator 77. This contactor 78 is operated by pushers, not shown, disposed on the periphery of the flywheel 61, having the same spacings as those of the teeth 59 on the cam 58.

The measuring operation of the diameter of the bore to be measured by exploration of the internal circumference C limiting the extension of the movable feeler 7 previously stated, is operated in accordance with the method illustrated in FIG. 4 permitting the determination of the theoretical radius R of a circle C related to a closed curve F by integration of the distances $r_1, r_2 \ldots r_n$ separating a predetermined number of points P of this curve F from a substantially central point O and angular spacings $l_1, l_2 \ldots l_n$ separating the said points such as P, the irregularities of the curve F being in fact here representative of the irregularities of the surface of the wall of the bore measured and the theoretical radius R determined being the half diameter of the said bore.

This measuring operation is effected in practice with the assistance of the gauge in the following manner:

The measuring head 3 is immobilised in the bore to be measured as previously described by the operation of the lever 6, the trigger 9 is then operated from left to right. In this translatory movement of the trigger 9 the trunnion 70 is pushed upwardly by the slide 71 in which it is engaged, entraining therewith the rack 63 to which it is secured. By its toothed part 62 meshing with the said rack 63 the shaft 19 is rotated and at the end of the course of the trigger 9, the lug 38 of the retaining pawl 37 of the lever 6 controlling the extension of the jaws 4 is released. The diameter of the toothed part 62 and the shaft 19, the usable course of the rack 63 and that of the trigger 9 are determined in such a manner that one complete turn of the shaft 19 is obtained before freeing the retaining pawl 37.

The shaft 19 communicates it rotational movement to the assembly of the parts to which it is connected, namely the disc 8 in which the movable feeler 7 is mounted, the flywheel 61 and the disc 53. In the course of this 360° rotation, at each passage of the fingers 56 and 57 of the disc 53 in front of the teeth 59 of the fixed circular cam 58, these fingers are freed from bearing against the teeth 59 and the rod 52 is biased towards the right hand side under the force of the spring 55. In this retracting movement the rod 52 drives the metallic blade 48 which is fixed thereto and this drive in turn extends the movable feeler 7 towards the outside of the rotatable disc 8 until it meets with the wall of the bore measured against which it is maintained pressed by the effect of the spring 55 during the brief time of liberation of the fingers 56 and 57 of the disc 53 in the teeth 59 of the fixed cam 58. During this brief lapse of time the contactor 78 is operated at the precise moment when the feeler is at the predetermined angular spacing which corresponds to the angular spacing between the consecutive axes of the teeth 59, in a manner to deliver to the calculator 77, a measuring signal representative of the radius r detected by the movable feeler 7 at each corresponding angular spacing, as indicated in FIG. 4.

The circuit for treatment of signals emitted during the complete turn of the movable feeler 7 is established in the calculator 77 as a function of a mathematical formula chosen integrating the radii $r_1, r_2 \ldots r_n$ and the angular distances of a diverse point P the position of which with respect to the axis of rotation of the disc 8 is thus detected by the movable feeler 7 in the course of one of its complete sweeping of the circumference C. The output signal of this calculator is transmitted to the display device 10 as shown in FIG. 1 which can be made in any known or appropriate manner. The ambit of the invention is not limited to the method described for determining the diameter of the bore from the relative data of the diverse radii $r_n$ and angular spacings $a_n$ of a predetermined number of points P sensed by the movable feeler of the interior gauge in accordance with the invention.

There is given as an example another method illustrated in FIG. 5 in which the theoretical radius R of a circle limited by the circumference C relative to the closed curve F is determined in accordance with a calculating method named "by regression" from cartesian co-ordinates x and y at points P measured by the movable feeler.

FIGS. 6 and 7 show schematically two constructional variations permitting the application of this other method of determination, limited to the form and to the type of angular and radial mobility which can be given to the feeler and to its carrying shaft.

In FIG. 6, the movable feeler 79 is in the form of an axial spherical zone of small thickness and of diameter substantially equal to the outer diameter of the head of the measuring cylinder 80. This movable feeler 79 is carried by a shaft 81 swingably mounted in a bearing 82 in which this shaft pivots by a swivel 83. The bearing 82 is fixed in the measuring head 80.

Substantially at an equal distance from the swivel 83 as the feeler 79, the shaft 81 has on its other side a spherical end 84 engaged in an axial cylindrical housing of a driving plate 85 carrying ball bearings 86 maintained pressed against a table 87 of the body 88 of the instrument by a spring 89.

In this variant the movable feeler 79 can be brought into contact with any point P desired of the circumference C limiting the cross-section of the bore to be measured by displacement of the driving plate 85 and the displacements thereof measured by a means chosen from known means, for example relating to those of control devices of cartesian co-ordinate reproduction machines.

In this case the calculating program included in the calculator of the instrument takes into account the linearity error introduced in this feeler transmissions system 79—plate 85, which is due to the fact that all linear displacement of the plate 85 in its plane of action produces a semi-circular displacement of the feeler in its spherical sector of action.

This necessity is eliminated in the variation represented in FIG. 7.

In this variation of the movable feeler 90 there is a cylindrical disc of small thickness carried by a shaft 91 at the other end of which there is directly fixed a driving plate 92 having ball bearings 93 maintained pressed against a table 94 of the body 95 by a spring 96. The shaft 91 carrying the feeler is free inside the measuring head 97. In this mounting, the movable feeler 90 faithfully reproduces all movement of the driving plate 97 and the linearity of the transmission is here perfect.

In these two constructive variations represented in FIGS. 6 and 7, the immobilisation mechanism for the measuring head will be adapted to the fact that the interior of the measuring head 80–97 must permit the free movement of the shaft carrying the feeler and will comprise for example jaws in the form of inclined radial keys the expansion of which will be effected by axial displacement, these jaws being inserted in the thickness of the wall of the measuring head which could, for a same measuring capacity as the gauge described in FIGS. 1 to 3 be conceived thicker for this purpose.

Similarly, the mechanism adapted to effect and coordinate the movements of the movable feeler of these two variants will be adapted to the movement of the driving plates 85 and 92 and will comprise, for example, components adapted to determine combined translational movement in their plane of action in accordance with a pre-established polygonal path tangential to the end of each successive stage of the direction change of the periphery of the movable feelers 79 and 90 with the next desired point of contact on the circumference C of the bore explored.

In the embodiment thus described in its variants, the electic energy necessary for the production of measuring signals, to their treatment, as well as the display of the resultant values can be variously furnished and in accordance with the wish of the user, either by incorporated batteries or accumulators, for example in the lower part of the handle 2, under the trigger 9, or by a feed cable connected to the mains supply.

The interior gauge described offers in its general form the advantage of being a very simple and rapid manipulation with respect to those which are known and permits rapid and reliable measurement due to the fact that the immobilisation function of its measuring head placed in the bore to be measured is automatic and that this function is independent of the measuring function, itself also automatic. This independence from the measuring system permits only the use of low contact pressures, which preserves its movable members from rapid wear.

Moreover, the reliability of this interior gauge is increased by the greater number of reference points which it is possible to measure, which eliminates all possible error produced by a point irregularity of the surface such as small burrs, hard dust, metallic chips or even traces of grease.

In the embodiment described, the control system by combined lever and trigger offers a perfect security, due to the fact of the impossibility of releasing the immobilisation jaws 4 of the measuring head 3 in the bore before the end of the measuring operation, that is to say before a complete exploration turn of the movable feeler 7, the control lever 6 for the jaws 4 not being able to be freed from the slot position except at the end of the course of the control trigger 9 for the sweeping of the movable feeler 7.

The limitation of the contact of the movable feeler 7 for certain desired points, attained by the spacing cam 58, preserves on the one hand the wear of the feeler and on the other hand avoids hysteresis phenomena which could be produced in the measuring signal transmission in the case of permanent contact of the feeler during a complete exploration turn of the cross-section of the measured bore.

Finally, the radial movement system of the movable feeler 7 permits freeing this from all constraint due to the cam 58 in each of the output movements of the rotatable disc 8, this cam only operating on the feeler for retracting this between each feeling point. In this way, the successive contacts of the movable feeler with the wall of the bore are soft and resiliently ensured, without constraint, by the effect of the spring 55.

Constructional variants could be brought thereto, for instance, the trigger control device of the movements of the movable feeler could be replaced by an automatic motor device engaged by an end of travel contactor of the extension control lever for the jaws and disengaged by an end of travel contactor of the rack.

The display device of the bore diameter measured could be independent of the body, incorporated, for example, in a control table connected by a lead to the output of the calculator of the gauge; or further, the assembly of the calculator and of the display device could be independent and connected to the output of the measuring collector of the gauge.

The number of points measured in the course of one complete turn of the movable feeler in the bore could be different than eight, which is only given as an example and could be adapted as required.

Finally one would not depart from the scope of the invention by ensuring the permanent contact of the feeler with the wall of the bore during a complete exploration turn when the influence of the hysteresis phenomenons are judged to be insignificant to the quality of the measurement to be effected.

What we claim is:

1. An interior gauge in which a body is provided with a measuring head capable of being introduced into a bore to be measured, in which a measuring feeler is movable with respect to said head and adapted to be put into contact with the wall of the bore, and in which a measurement transducer, the movable components of which are connected to the movable feeler, is adapted to produce output signals representative of the displacement of said movable feeler, said gauge comprising a mechanism for immobilizing the measuring head in the bore to be measured including members for bearing on the wall of said bore and a manual control for said mechanism, a feeler movable angularly and radially in a surface limited by a circumference contained in a plane perpendicular to the axis of revolution of the bore to be measured once the measuring head is immobilized therein, a shaft carrying said movable feeler, a driving mechanism for said shaft and for said movable feeler including members adapted to effect and coordinate the angular and radial movement of the movable feeler and to put this into successive contacts with the wall of the bore at a chosen number of points spaced over the circumference of said bore, a calculator for the treatment of said signals connected to the measurement transducer via a connecting circuit, a position detector for the movable feeler inserted in said circuit comprising a component sensitive to said position and adapted to close said circuit at each chosen contact of the movable feeler with the wall of the bore to be measured, and a display device for displaying the value represented by the output signal of the calculator adapted to be connected to the output of said calculator.

2. An interior gauge according to claim 1, wherein said mechanism for immobilizing the measuring head comprises at least three jaws having an inclined base and generatrices of contact parallel to the axis of the measuring head, said jaws being radially extensible, regularly arranged on the periphery of said measuring head and resiliently pressed on a conical end of a shaft coaxial with the measuring head, a control lever for the extension of said jaws by displacement of the conical end of the shaft under the inclined base of the jaws, a first resilient connection between said shaft and the body of the gauge adapted to retract said shaft, a second resilient connection between said shaft and the lever controlling the extension of the jaws, and an immobilization member for the second resilient connection on the shaft, in a neutral position of the control lever.

3. An interior gauge according to claim 2, comprising a latching member for the end of course of the lever controlling the extension of the jaws.

4. An interior gauge according to claim 3, wherein the latching member for the end of course of the control lever for the extension of the jaws is a retaining pawl pivotally connected to said lever, pressed against a wall of the body of the gauge, said wall having a notched housing for a lug of the pawl.

5. An interior gauge according to claim 1, comprising a measuring feeler mounted to be radially movable in a rotatable disc secured to a driving shaft coaxial with the measuring head, a toothed pinion secured to said driving shaft, a rack engaging said pinion, and a driving trigger for the rack.

6. An interior gauge according to claim 5, comprising a control rod for the radial displacement of the movable feeler coaxial with its rotational driving shaft and connected to said feeler by a supple inextensible bond via an angle return, a toothed circular cam fixed in the body of the gauge, a disc comprising interceptor members for said cam, and a resilient means resiliently pressing the control rod of the movable feeler against the interceptor disc, the depth of the teeth of the cam being greater than the total course of the movable feeler and said rod being in contact with the feeler of the measurement transducer.

7. An interior gauge according to claim 4, comprising a control trigger for the displacement of the movable feeler, said control trigger sliding along the wall having the notch for the lug of the pawl of the control lever for the extension of the jaws, on the other side of the wall with respect to said pawl, said trigger being formed to release the lug of the pawl from the notch at the end of the course of the trigger.

8. An interior gauge according to claim 6, comprising a contactor for the closure of the connecting circuit of the measurement transducer to the calculator disposed opposite the periphery of the interceptor disc of the cam, and said periphery of the disc comprises pushers adapted to operate said contactor, these pushers being arranged at the same angular spacing as those of the axis of the teeth of the cam.

9. An interior gauge according to claim 1, comprising a movable feeler in the form of an axial spherical zone, a shaft axially carrying said feeler and swingably mounted in a fixed bearing in the measuring head, said shaft having a spherical end opposite the feeler, a driving plate having ball bearings and a cylindrical housing in which is engaged said spherical end, and a table secured to the body of the gauge against which the ball bearing plate is pressed.

10. An interior gauge according to claim 1, comprising a movable feeler in the form of a cylindrical disc, a shaft axially carrying said feeler, a ball bearing driving plate fixed parallel to the plane of the feeler on the opposite end of the shaft, and a table secured to the body of the gauge against which the ball bearing plate is pressed.

11. An interior gauge according to claim 9, comprising a mechanism to prime the driving plate of the shaft of the movable feeler with combined movements of translation in its plane of action in accordance with a pre-established polygonal path.

12. An interior gauge according to claim 10, comprising a mechanism to prime the driving plate of the shaft of the movable feeler with combined movements of translation in its plane of action in accordance with a pre-established polygonal path.

* * * * *